United States Patent [19]

Segall

[11] Patent Number: 4,708,285
[45] Date of Patent: Nov. 24, 1987

[54] FLOPPY DISK DIRECTORY ENVELOPE FORM

[76] Inventor: Peter L. Segall, 117 E. 77th St., New York, N.Y. 11021

[21] Appl. No.: 860,500
[22] Filed: May 7, 1986
[51] Int. Cl.⁴ .............................................. B65D 27/00
[52] U.S. Cl. .................................... 229/68 R; 229/70; 229/74; 229/92.8
[58] Field of Search .................... 229/70, 74, 75, 68 R, 229/69, 92, 92.1, 92.8

[56] References Cited

U.S. PATENT DOCUMENTS

| | | | |
|---|---|---|---|
| 866,167 | 9/1907 | Tiffany | 229/70 |
| 3,368,741 | 2/1968 | Mercur | 229/70 |
| 3,506,186 | 4/1970 | Clemm | 229/70 |
| 3,537,637 | 11/1970 | Hiersteiner | 229/70 |
| 3,863,835 | 2/1975 | Gendron | 229/70 |
| 4,436,202 | 3/1984 | Berkley | 229/70 |
| 4,473,153 | 9/1984 | Colangelo | 229/68 R |
| 4,549,658 | 10/1985 | Sfikas | 229/74 |

Primary Examiner—Willis Little
Attorney, Agent, or Firm—Handal & Morofsky

[57] ABSTRACT

A form having a stock paper size and having perforations or the like which define a predetermined shape capable of being folded into an envelope includes closing extensions having a self-adhesive layer of disposed on one side thereof. The perforations also define a label having a self adhesive material disposed on the same side of said form as said form as said adhesive layer disposed on said extension.

12 Claims, 8 Drawing Figures

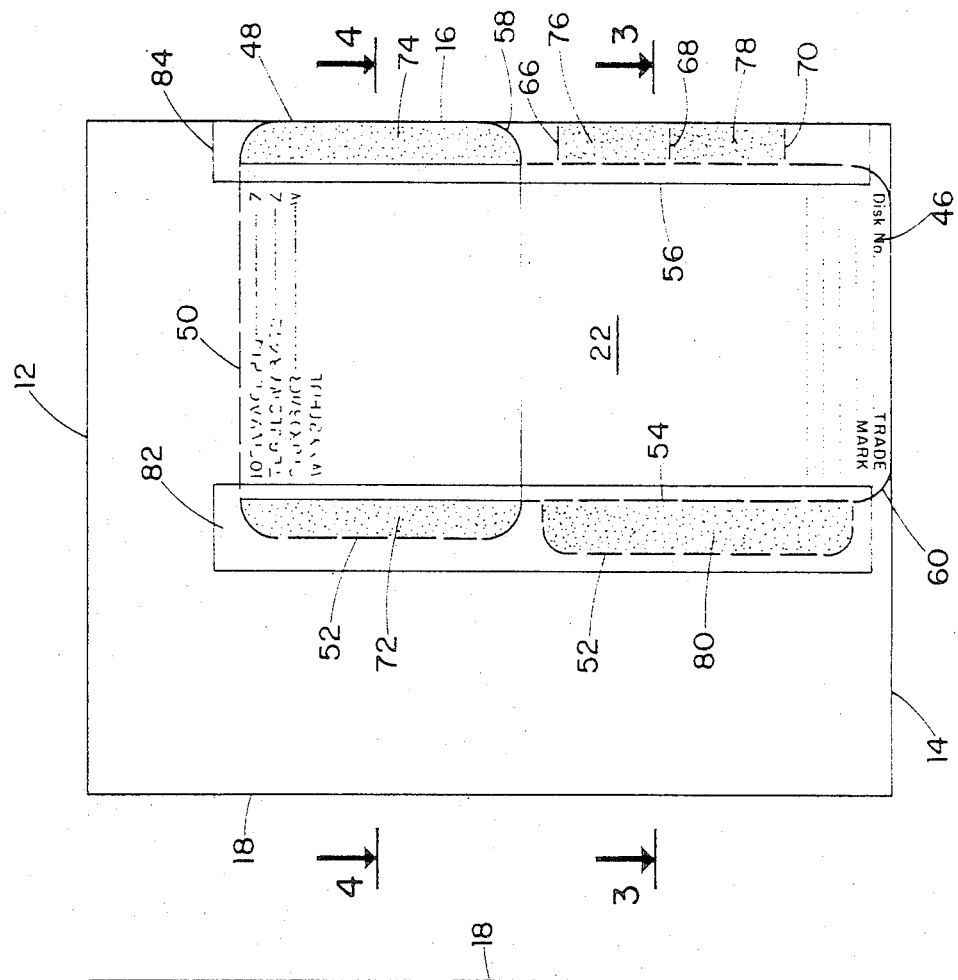
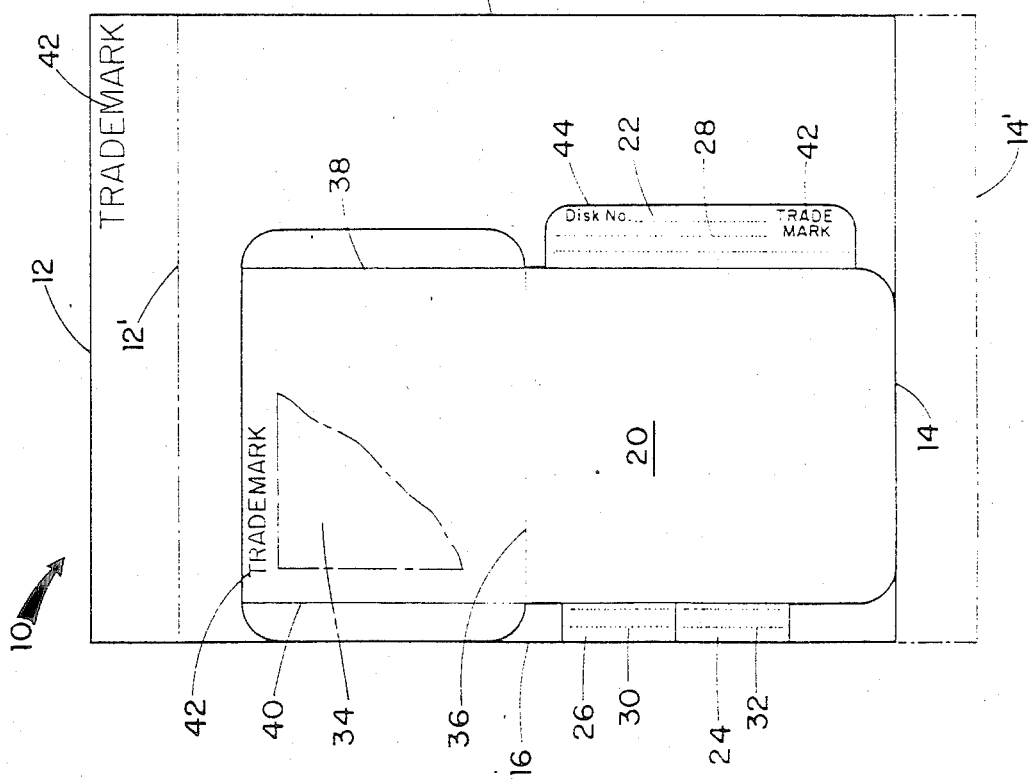
Fig. 1
Fig. 2

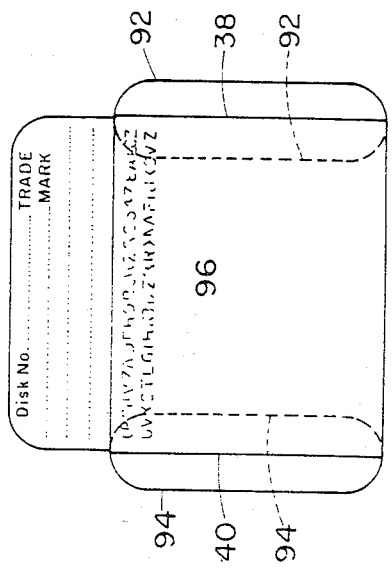
Fig.5
Fig.6
Fig.8
Fig.3
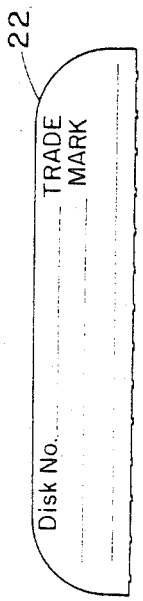
Fig.4
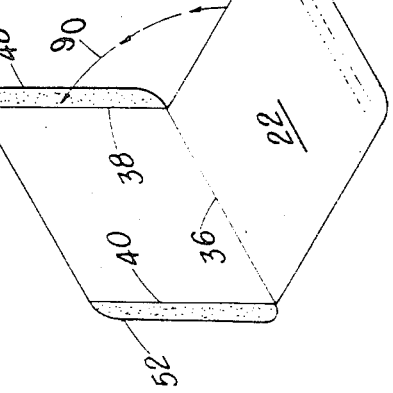
Fig.7

FLOPPY DISK DIRECTORY ENVELOPE FORM

TECHNICAL FIELD

The invention relates to forms useful for being imprinted with a directory and foldable into an envelope for containing a floppy disk.

BACKGROUND

Recent years have seen extensive growth in the use of the floppy disk as a medium for storing data, information, programs and the like. In the case of personal computers, most often the information stored on a disk takes the form of a number of documents or programs each having a name and perhaps, a subname taking the form "name.subname" where the name is limited to eight alphanumeric symbols and the subname is limited to three alphanumeric symbols.

Naturally, by mere visual inspection of a disk, it is not possible to ascertain the identity of the various items of information recorded thereon. Accordingly, floppy disks are generally provided with a plurality of stick-on labels which are made of paper and a self-adhesive material on one side. The purpose of these labels is to provide a surface for writing notations respecting the file or program contents of a disk and to be adhered directly to the disk. Typically one takes one of these labels and adheres it to the floppy disk and then annotates the label with the various file or program names. As this information changes, the label may be marked up further, until ultimately, there is no room left on the label. At this point, the user takes a new label, adheres it over the old label or on another place on the floppy disk and continues the process. This process suffers a number of obvious and unobvious inadequacies.

Firstly, the labels are generally adhered to the disk prior to being written on. Accordingly, they must be written on by hand as floppy disks are not, at the present time, capable of being put through a typewriter without a serious likelihood of damage to the information stored thereon. Because handwriting is often illegible, the contents of the disk may not be legible to later users of the disk.

In addition to the problem of illegibility of handwriting, there also exits the problem that the application of numerous stickers to a disk will cause it to have an unsightedly appearance, present an obstruction to placing the disk in its drive and, indeed, finally to clutter the file in which the disks are stored.

Furthermore, disks are very often damaged when they are written on. Ball point pen, pencils and roller ball markers are particularly likely to damage disks. Felt tip markers are preferred for marking a label which is already adhered to a disk.

Finally, labels have limited area and, in practice, there is seldom more than enough room to enter the name of the disk and the date on which it is made. This, combined with the fact that the operator may become impatient and careless with the time necessary for writing on a disk, often results in abbreviated and unrecognizable notes on disks. One solution to this problem is to instruct the computer to print out a directory of disk file/program information of a separate piece of paper which is then cut and folded to fit inside the envelope within which the floppy disk is normally contained. While this approach does solve the problem of complete and legible descriptions which are made with a minimum of operator effort, it introduces a serious bulk problem in filing of floppy disks and introduces the possibility that a directory may fall from an envelope and become associated with the wrong disk. Obviously, this could result in loss of valuable data or programming.

SUMMARY OF THE INVENTION

The invention, as claimed, is intended to provide a remedy. It solves the problem of how to label a floppy disk envelope with the disk electronic contents without substantial operator effort and link the disk to the envelope, in a minimum of time and with complete and legible contents.

The above is achieved by providing a form having a stock paper size and having perforations or the like which define a predetermined shape capable of being folded into an envelope for containing a floppy disk. Perforations or the like are disposed in positions with respect to the stock paper size such that the envelope (which the perforations define when folded into completed form) includes a labelling area which coincides (in the unfolded, unseparated form) with the normal printing field produced by a computer printing a standard one column or multiple column directory such as that printed using the MS-DOS TM system. Of course this form can be adapted to be compatible with any other disk operating system capable of printing a directory table of file contents or catalogue or word processing or other program having this capability. In order to securely assemble the inventive envelope, self-adhesive material and protective release agent surfaced materials are provided therefor at points on the shape to be cut out where adhesive is required to maintain the shape of the assembled envelope.

Additional adhesive may be provided on other parts of the form which may also be perforated, scored or cut to define labels. A degree of protection from misassociation of envelopes and disks is provided by similarly color-coding and/or numbering adhesive disk labels and envelopes.

BRIEF DESCRIPTION OF DRAWINGS

One way of carrying out the invention is described in detail below with reference to drawings which illustrate only one specific embodiment, in which:

FIG. 1 is a plan view of the information receiving portion of the form of the present invention;

FIG. 2 is a plan view of the reverse of the form illustrated in FIG. 1 in which the position of the top and bottom of the form has been maintained and the right and left edges of the form have been reversed;

FIG. 3 is a view along line 3—3 of FIG. 2;

FIG. 4 is a view along line 4—4 of FIG. 2;

FIG. 5 is a view of a small label for adhesion onto a floppy disk;

FIG. 6 is a view of a large label for adhesion onto a floppy disk or onto an envelope, manila folder, or tab of a separator in a ring binder or other catagorizing or organizational device;

FIG. 7 is a view showing the folding of the form which forms the envelope after the removal of other material and in a partially folded condition; and FIG. 8 illustrates the envelope after folding has been completed.

DETAILED DESCRIPTION

Referring to FIG. 1, the front of an envelope form 10 constructed in accordance with the present invention is illustrated. Envelope form 10 has a top edge 12, a bottom edge 14, a left edge 16 and a right edge 18. It is contemplated that the dimensions of the form, that is to say length of the left edge and the width of the top edge preferably define a standard stock size paper typically, eight and one-half inches by eleven inches.

Printed on the front of the form in a particular color of ink which is used on both sides of a given form and which may be varied from form to form for organizational or identification purposes are a plurality of indicia. These indicia generally define an envelope blank 20 and a number of labels 22, 24 and 26. The labels have printed matter 28, 30 and 32 disposed thereon in the particular selected ink color. The printed matter on these labels is contemplated, in accordance with the preferred embodiment, to include a number or name identifying the disk. Disposed on form 10 is the envelope blank which is defined by perforations which allow it to be separated from blank form 10. The perforations also allow the separation of labels 22–26, as will be described in detail in connection with FIG. 2.

It is contemplated that the form will include a field 34 on which a directory titles or index of contents of a given disk, will be printed using system commands or software utilities by simple insertion of the form into the printer. In the event that one wishes to use a printer with an automatic paper feeding attachment, the printing start point cannot be user defined and, accordingly, it may be desirable to shift the position of the envelope blank 20 upwardly. This is diagramatically illustrated in phantom lines in FIG. 1, if one considers the position of blank 20 on a paper having a top edge 12' and a bottom edge 14'. Generally, it is contemplated that different printers may require special form arrangements.

Folding of the envelope into a form may be facilitated by the optional addition of score lines 36, 38 and 40. In the alternative, the score lines may be replaced by simple printed indicia indicating where folding is to occur. Finally, in order to provide some kind of association between disks bearing labels 22 and the particular envelope, the trademark 42 of the maker may be imprinted at various positions in the particular color of ink selected. In addition, an alphanumeric designation 44 on label 22 may be used to associate a disk (through the adhesion of label 22 to a disk) with an envelope which also bares the same alphanumeric designation as illustrated at numeral 46 in FIG. 2.

FIG. 2 also illustrates the perforations provided in accordance with the preferred embodiment. Generally, the envelope blank 20 is defined by a partial side edge 48, and perforations 50, 52, 54, 56, 58 and 60. Label 22 is defined by perforations 54 and 62. Labels 24 and 26 are defined by perforation 56 side edge 64 and perforations 66, 68 and 70.

The form illustrated in FIG. 2 has several self-adhesive layer placed thereon, including, adhesive layers 72 and 74 which serve to secure the envelope in its folded position and adhesive layers 76, 78 and 80 which serve to provide an adhesive backing to labels 26, 24 and 22. Finally, the self-adhesive layers are protected from dust and unintentional sticking by protective tabs 82 and 84 which are coated on the their undersides (i.e. the sides which contact the adhesive) with a release agent 86 such as wax, or teflon coating. This aspect of the invention can be seen more clearly in FIGS. 3 and 4 in which thicknesses have been greatly exaggerated. It is noted that the base for release agent 86 may be any suitable material such as paper substrate 88. The separated labels are illustrated individually in FIGS. 5 and 6.

The inventive envelope in a stage of partial assembly is illustrated in FIG. 7. Here all the material except for the envelope blank 20 has been removed and the blank has been folded along score line 36. This folding operation is continued in the direction of arrow 90 until the envelope takes the form illustrated in solid lines in FIG. 8. Tabs 92 and 94 are then folded onto the back of the partially assembled envelope illustrated in FIG. 8, thus forming a pocket with the tabs 92 and 94 in the position illustrated in dash-dot phantom lines in FIG. 8.

When it is desired to use the inventive form 10, one simply inserts the form 10 into a printer and instructs the computer to print the directory in accordance with standard practice for the particular disk operating system employed. Once this has been done the printed directory 96 will take the position illustrated by field 34 in FIG. 1. The envelope blank 20 is then removed by breaking the perforations and folded as indicated in FIGS. 7 and 8 to form a pocket by first folding along score line 36 and then folding tabs 92 and 94 over the opposite side of envelope blank 20 by folding them along score lines 38 and 40.

At this point the disk number or name is annotated and identified as is indicated in the finished envelope illustrated in FIG. 8 and label 22 bearing the same annotated identification and the same color as illustrated in FIG. 6 is adhered to the floppy disk and the floppy disk inserted into the envelope with label 22 showing.

While an illustrative embodiment of the invention has been described, it is, of course understood that various modifications will be obvious to those of ordinary skill in the art. For example, it is possible to replace protective tabs 82 and 84 with an 8½ inch by 11 inch protective sheet which overlies the form and have cut out form elements adhered to the sheet, thus eliminating the need to rip perforations. Extra material may also be added to the form to provide a feeder leader or the like. In addition, forms may be put on continuous perforated accordian folds or they may be padded together at one edge for easy use. Such modifications are within the spirit and scope of the invention which is limited and defined only by the appended claims.

I claim:

1. An envelope form, comprising:
   (a) a standard sized sheet of paper;
   (b) perforation means defining an envelope blank having a front panel, and a rear panel disposed adjacent to said front panel, said panels having associated therewith envelope closing extensions;
   (c) said panels being disposed on said sheet at a position where a directory may be caused to be printed on said sheet;
   (d) a self-adhesive layer disposed on each of said extensions;
   (e) protective means disposed over each of said self-adhesive areas; and
   (f) said perforations defining a label, said label having a self adhesive material disposed on the same side of said sheet as said adhesive layer disposed on said extensions and an adhesive protective layer disposed over said self adhesive layer.

2. An envelope form as in claim 1, wherein said envelope form is printed with ink in a color which appears on both the envelope portion of said form and on the label portion thereof.

3. An envelope form as in claim 2, wherein an identification number appears on the envelope portion and the label portion.

4. An envelope form as in claim 3, wherein said extensions are disposed on opposite sides of the same panel.

5. An envelope form as in claim 1, wherein a single protective member covers the adhesive layers on a label and an extension.

6. An envelope form as in claim 1, wherein header space is provided between the edge of the sheet and the panels.

7. An envelope form as in claim 1, wherein said label has a width less than or equal to the difference in height between said front panel and said rear panel, said panels having different heights along the direction of form feed through a printer.

8. An envelope form, comprising:
(a) a standard sized protective member;
(b) an envelope blank having a front panel, and a rear panel disposed adjacent to said front panel, said panels having associated therewith envelope closing extensions;
(c) said panels being disposed over said protective member at a position where a directory may be caused to be printed on said sheet; and
(d) a self-adhesive layer disposed on each of said extensions and positioned between said extensions and said protective member to secure said extensions to said protective members.

9. An envelope form as in claim 8, further comprising a label, said label having a self adhesive material disposed on the side thereof adjacent said protective member said label being adhered to said protective member.

10. An envelope form as in claim 9, wherein said envelope form is printed with ink in a color which appears on both the envelope portion of said form and on the label portion thereof.

11. An envelope form as in claim 10, wherein an identification number appears on the envelope portion and the label portion.

12. An envelope form as in claim 11, wherein said extensions are disposed on opposite sides of the same panel.

* * * * *